United States Patent
Gschwind et al.

(10) Patent No.: US 10,671,397 B2
(45) Date of Patent: *Jun. 2, 2020

(54) REDUCED SAVE AND RESTORE INSTRUCTIONS FOR CALL-CLOBBERED REGISTERS

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 506 days.

This patent is subject to a terminal disclaimer.

(21) Appl. No.: 15/402,696

(22) Filed: Jan. 10, 2017

(65) Prior Publication Data

US 2018/0196676 A1 Jul. 12, 2018

(51) Int. Cl.
*G06F 9/38* (2018.01)
*G06F 9/30* (2018.01)

(52) U.S. Cl.
CPC .......... *G06F 9/3838* (2013.01); *G06F 9/3005* (2013.01); *G06F 9/30098* (2013.01)

(58) Field of Classification Search
None
See application file for complete search history.

(56) References Cited

U.S. PATENT DOCUMENTS

| | | | |
|---|---|---|---|
| 5,375,241 A | 12/1994 | Walsh | |
| 5,555,417 A | 9/1996 | Odnert et al. | |
| 7,010,785 B2 | 3/2006 | Haber et al. | |
| 7,698,692 B1 * | 4/2010 | Garud | G06F 11/3466 714/38.14 |
| 9,218,168 B1 * | 12/2015 | Gschwind | G06F 8/54 |
| 9,218,170 B1 | 12/2015 | Gschwind et al. | |
| 9,229,695 B2 | 1/2016 | Gschwind et al. | |
| 9,250,875 B1 | 2/2016 | Gschwind et al. | |
| 2007/0234286 A1 | 10/2007 | Huang et al. | |

(Continued)

OTHER PUBLICATIONS

Karger, PA.: "Using registers to optimize cross-domain call performance", 11 pages, ACM, 1989.

(Continued)

*Primary Examiner* — Bing Zhao
(74) *Attorney, Agent, or Firm* — Patterson + Sheridan, LLP

(57) ABSTRACT

A method and associated computer program product are disclosed for generating an executable file from an object file, the object file being associated with an architecture having a predefined calling convention designating one or more call-clobbered registers. The method comprises identifying, from a first annotation included in the object file with a function call instruction, at least one restore instruction that follows the function call instruction, the function call instruction associated with a predefined function of the object file. The at least one restore instruction corresponds to at least one of the one or more call-clobbered registers. The method further comprises determining, based on at least a first list of registers that are referenced by the predefined function, the first list being included in the object file, whether to eliminate the at least one restore instruction.

16 Claims, 6 Drawing Sheets

(56) References Cited

U.S. PATENT DOCUMENTS

2008/0270990 A1    10/2008   Kornstaedt
2018/0196669 A1     7/2018   Gschwind et al.

OTHER PUBLICATIONS

Disclosed Anonomously, "Method for limiting save and restore of callee-saved registers.", An IP.com Prior Art Database Technical Disclosure, Oct. 16, 2014.
Disclosed Anonomously, "Application Binary Interface Modeling of Stack Layout and Function Call Sequence for Code Generation and Stack Management in Retargetable Compilers.", An IP.com Prior Art Database Technical Disclosure; Jan. 24, 2012.

* cited by examiner

REDUCED SAVE AND RESTORE INSTRUCTIONS FOR CALL-CLOBBERED REGISTERS

BACKGROUND

Embodiments disclosed herein relate to the field of computer architecture. More specifically, embodiments disclosed herein relate to techniques for reducing save and restore instructions included within generated executable files.

SUMMARY

According to one embodiment, a method is disclosed for generating an executable file from an object file, the object file being associated with an architecture having a predefined calling convention designating one or more call-clobbered registers. The method comprises identifying, from a first annotation included in the object file with a function call instruction, at least one restore instruction that follows the function call instruction, the function call instruction associated with a predefined function of the object file. The at least one restore instruction corresponds to at least one of the one or more call-clobbered registers. The method further comprises determining, based on at least a first list of registers that are referenced by the predefined function, the first list being included in the object file, whether to eliminate the at least one restore instruction.

According to another embodiment, a computer program product is disclosed comprising a computer-readable device having computer-readable program code embodied therewith, the computer-readable program code being executable by one or more computer processors to perform an operation for generating an executable file from an object file. The object file is associated with an architecture having a predefined calling convention designating one or more call-clobbered registers. The operation comprises identifying, from a first annotation included in the object file with a function call instruction, at least one restore instruction that follows the function call instruction, the function call instruction being associated with a predefined function of the object file. The at least one restore instruction corresponds to at least one of the one or more call-clobbered registers. The operation further comprises determining, based on at least a first list of registers that are referenced by the predefined function, the first list being included in the object file, whether to eliminate the at least one restore instruction.

BRIEF DESCRIPTION OF THE SEVERAL VIEWS OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
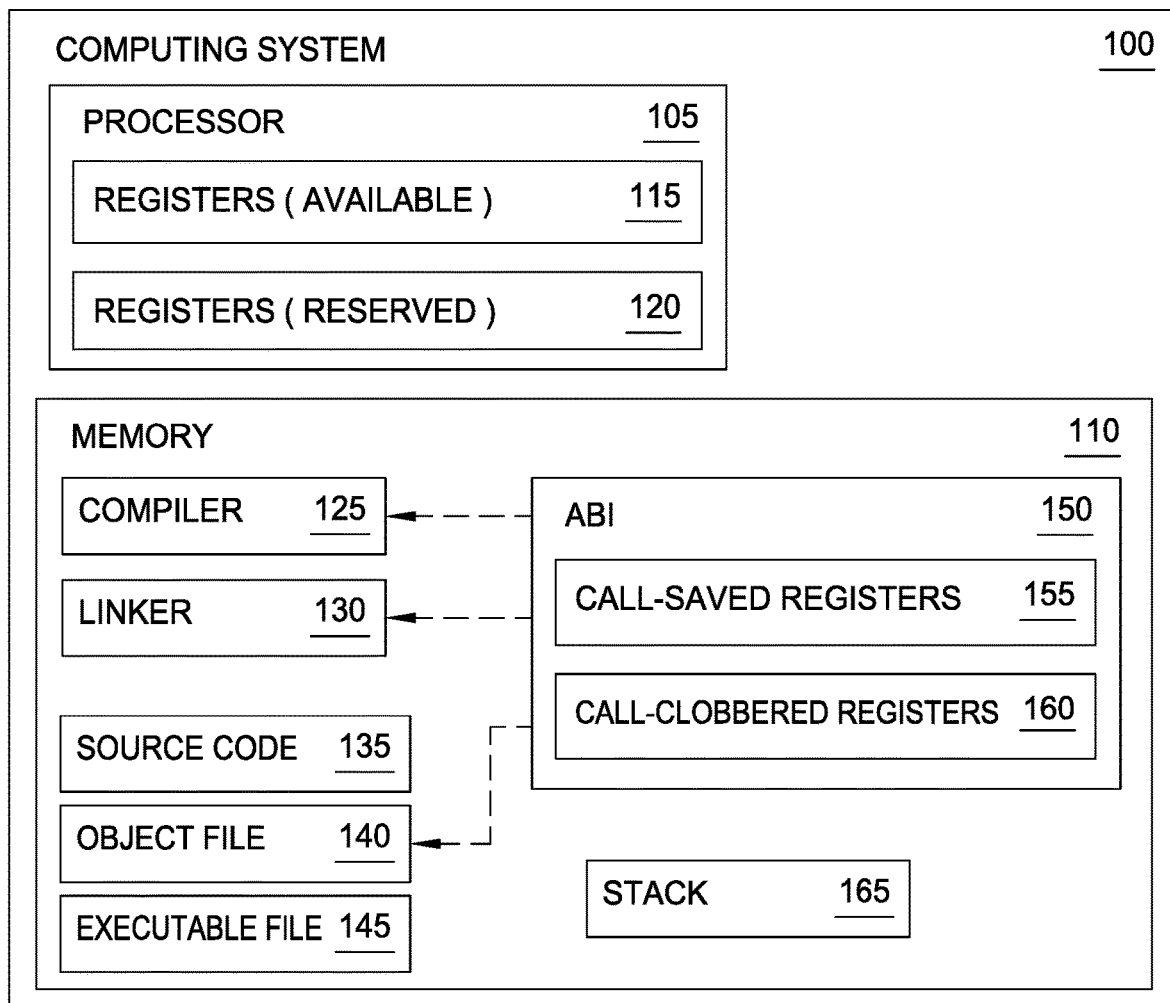
FIG. 1 is a block diagram illustrating an exemplary computing system for generating an executable file with reduced save and restore instructions for designated call-clobbered registers, according to one or more embodiments disclosed herein.

In computer software, an application binary interface (ABI) describes the low-level interface between an application program and the operating system or between the application program and another application. The ABI covers details such as data type, size, and alignment; the calling conventions which controls how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allowing a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up occurs before the application is executed on a particular hardware platform.

A compiler generally works on a single source file (e.g., a compile unit) at a time to generate an object file comprising machine code specific to a particular computer architecture. A linker generally combines, into a single module, one or more separately-compiled object files derived from distinct source files, and builds a single reference table (e.g., a global offset table (GOT) and/or table of contents (TOC)) that is shared by files in the module. An executing application generally includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Within the calling conventions defined by the ABI, one or more processor registers are designated as being "call-saved" or "call-clobbered". For a "call-saved" register, a calling function (or caller) may expect that the register retains its previous value after the function call returns. It is therefore the called function's (or callee's) responsibility to ensure that this condition is met, typically by either not using the register at all, or by performing a save of the register's contents and later restoring the saved contents. For a "call-clobbered" register, the callee does not have responsibility to maintain the register's previous value, and the caller should not expect that the register's contents remain unchanged across the function call. Therefore, if the caller stores a value in a call-clobbered register that is needed later, the caller should perform a save of the value and restore it later.

While maintaining these rules can ensure correct operation of a program across function call boundaries, the resulting overall execution sequence will sometimes contain unnecessary operations. For example, a caller may save and later restore a value held in a call-clobbered register while performing a function call, but if the actual callee does not modify the register, the save and restore instructions are not necessary. These unnecessary saves and restores tend to consume processor resources and slow down execution. The effects of the unnecessary saves and restores can be significant, such as in the case in which the callee is a relatively short subroutine. In this case, the loading of a value from memory that was very recently stored can trigger pipeline hazards (e.g., "load-hit-store") in certain processor microarchitectures.

It is therefore beneficial to reduce the number of unnecessary saves and restores within a final executable file. However, the compiler that generates the caller code may not be aware that the saves and restores are unnecessary, since the compiler operates on a single compilation unit at a time and generally does not know the code of the callee routine that will ultimately be called by the caller. While the linker that produces the final executable may know the code of the callee routine, at the linking stage it is typically too late to change the generated code to take advantage of this knowledge.

Embodiments of the disclosure are generally directed to techniques for reducing save and restore instructions included within generated executable files through cooperative operation of the compiler and the linker. According to various embodiments, the compiler generates object files comprising code that is amenable to elimination of save and restore instructions for call-clobbered registers, and further comprising suitable annotations that inform the linker about the generated code.

FIG. 1 is a block diagram illustrating an exemplary computing system 100 for generating an executable file with reduced save and restore instructions for designated call-clobbered registers, according to one or more embodiments disclosed herein. The computing system 100 comprises a processor 105 and a memory 110.

The processor 105 generally includes any processing element capable of performing various functions described herein. While depicted as a single element within the computing system 100, processor 105 is intended to represent a single processor, multiple processors, a processor or processors having multiple cores, as well as combinations thereof. In one embodiment, processor 105 represents a central processing unit (CPU) of the computing system 100. Memory 110 may include a variety of computer-readable media selected for relative performance or other capabilities: volatile and/or non-volatile media, removable and/or non-removable media, etc. Memory 110 may include cache, random access memory (RAM), storage, etc. Storage included in memory 110 typically provides a non-volatile memory for the computing system 100, and may include one or more different storage elements such as Flash memory, a hard disk drive, a solid state drive, an optical storage device, and/or a magnetic storage device.

As discussed above, an ABI 150 defines rules of interaction (or "calling conventions") between a caller function and a callee function. These rules specify how the caller function and callee function collaborate to safely share one or more available registers 115 of the processor 105. The one or more available registers 115 may include any suitable types of user-accessible registers, including general-purpose registers and/or special-purpose registers. The one or more available registers 115 are designated by the ABI 150 as either call-saved registers 155 or call-clobbered registers 160. The processor 105 may further comprise one or more reserved registers 120, which may be reserved for system use or other special purposes. Any reserved registers 120 are generally not designated by the ABI 150 as call-saved or call-clobbered.

Memory 110 includes a compiler 125 configured to generate an object file 140 from source code 135. The object file 140 comprises a plurality of functions and is stored in memory 110 for execution by the processor 105. The object file 140 may alternately be generated by a compiler external to the computing system 100. Memory 110 further includes a linker 130 configured to combine the object file 140 with one or more other object files and/or library files to generate a single executable file 145. In some embodiments, the compiler 125 and linker 130 cooperate to reduce the number of save instructions and restore instructions within the executable file 145. To achieve this, the compiler 125 generates an object file 140 comprising code that is amenable to the elimination of save and restore instructions for call-clobbered registers. The object file 140 further comprises suitable annotations that inform the linker 130 about the generated code.

Stack 165 comprises a data structure of memory 110 that stores information related to active functions during the execution of the object file 140. Each active function included in the object file 140 has a respective stack frame within stack 165 during execution.

Figure 2:
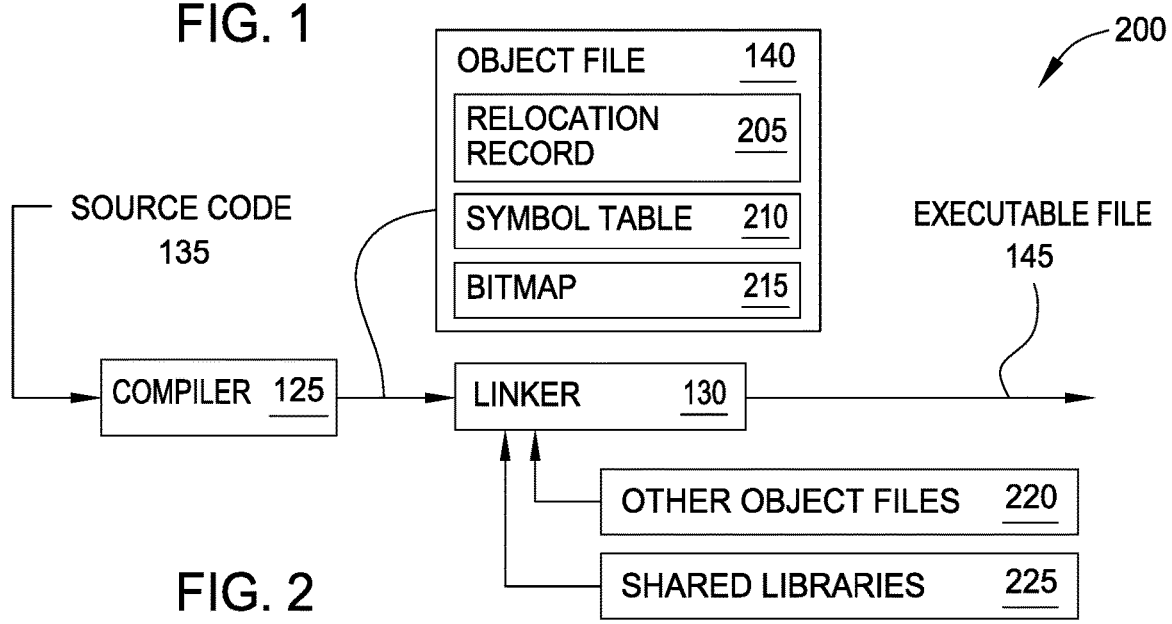
FIG. 2 is a diagram illustrating an exemplary sequence for compiling and linking to generate an executable file, according to one or more embodiments disclosed herein.

FIG. 2 is a diagram 200 illustrating an exemplary sequence for compiling and linking to generate an executable file, according to one or more embodiments disclosed herein. Diagram 200 may correspond to the computing system 100 of FIG. 1 or any suitable alternate computing system. The compiler 125 receives source code 135 and produces an object file 140 having one or more annotations and/or lists that inform the linker 130 about the generated code. In various embodiments, the cooperation of the compiler 125 and linker 130 can reduce the number of save instructions and restore instructions included within the object file 140.

In some embodiments, the compiler 125 includes one or more relocation records 205, symbol tables 210, and/or bitmaps 215 within the object file 140 for communicating with the linker 130. In some embodiments, annotations created for a function call instruction and/or for a restore instruction within the object file 140 are implemented via relocation records 205. In some embodiments, the object code 140 includes a symbol table 210 which is generated by the compiler 125 and comprises a data structure that associates each identifier (i.e., function and variable names) in a program's source code 135 with information relating to its declaration or appearance in the source code 135, such as type, scope level, and/or location. In some embodiments, the compiler 125 provides a first list of clobbered registers within in a bitmap 215 within a data structure associated with the function definition, e.g., the symbol table 210 entry for the function symbol. In some cases, the bitmap 215 represents all of the call-clobbered registers, and each set bit corresponds to a register that is actually clobbered by the function.

The linker 130 is configured to link the object file 140 with one or more other object files 220 and/or shared libraries 225 into an executable file 145. The shared libraries 225 comprise one or more functions that are external to the object file 140 and that may be called during execution of the object file 140 via external function calls.

In order to generate an object file 140 comprising code that is amenable to call-clobbered register save/restore code elimination, in some embodiments the compiler 125 performs code generation and register allocation according to known compiler techniques, but the compiler 125 instead makes an incorrect assumption that all of the registers are actually call-saved registers. In other words, the code generated by the compiler 125 incorrectly assumes that all of the designated call-clobbered registers remain unmodified across function calls. The compiler 125 may use standard data-flow analysis techniques to determine, for each function call site, which call-clobbered registers are assumed to be live across this function call.

Figure 3:
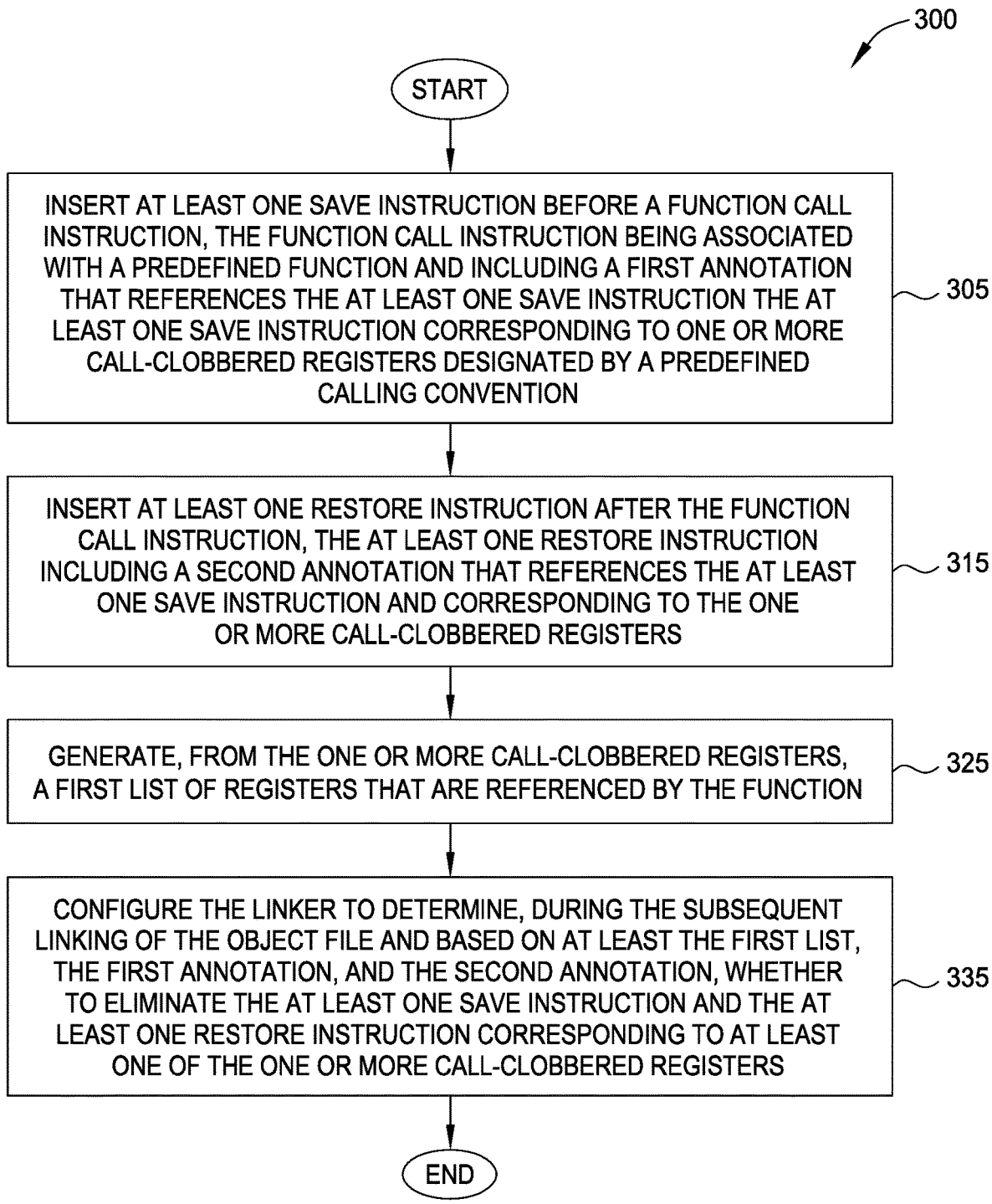
FIG. 3 is a flow chart illustrating a method for generating an object file for subsequent linking by a linker, according to one or more embodiments disclosed herein.

Now referring also to FIG. 3, method 300 begins at block 305, where the compiler 125 (or any alternate suitable compiler) inserts at least one restore instruction after a function call instruction. The function call instruction is associated with a predefined function and includes a first annotation that references the at least one restore instruction. The at least one restore instruction corresponds to one or more call-clobbered registers designated by a predefined calling convention. At block 315, the compiler inserts at least one save instruction before the function call instruction, the at least one save instruction including a second annotation that references the at least one restore instruction. The at least one save instruction corresponds to the one or more call-clobbered registers.

In some embodiments, the compiler 125 annotates the function call instruction to point to the corresponding restore instructions of block 305, and further annotates the save instructions to point to the corresponding restore instructions of block 315. Table 1 provides example pseudocode illustrating the insertion of save instructions, restore instructions, and annotations according to embodiments disclosed herein.

TABLE 1

| Example pseudocode | |
|---|---|
| f( ) | |
| { | |
| save REG for d( ) | //inserted save instruction |
| d( ) | //annotated function call instruction |

TABLE 1-continued

| Example pseudocode | |
|---|---|
| restore REG | //annotated, inserted restore instruction |
| }. | |

To correct for the incorrect assumption of the compiler 125, the compiler 125 at block 315 inserts a save instruction before the function call site to save the contents of the register to a reserved memory location, and at block 305 inserts a restore instruction to restore the register contents from the memory location after the function call. In one embodiment, the save and restore instructions are placed directly adjacent to the function call instruction, such as in Table 1. In another embodiment, the compiler 125 uses known instruction scheduling techniques to move the save and restore instructions away from the function call instruction to more distant locations within the same basic block. Moving the save and restore instructions within the same basic block may improve performance by mitigating pipeline hazards. In yet another embodiment, the compiler 125 uses known data-flow techniques (such as lazy code motion or related data-flow techniques) to move the save and restore instructions to different basic blocks. Moving the save and restore instructions within different basic blocks may further improve performance by eliminating potentially duplicate saves and restores within a loop, e.g., where a function call happens within the loop but the call-clobbered register is only needed again after the loop has terminated.

In any event, the compiler 125 ensures that the save instruction dominates the call instruction, with no intervening definition of the register, and that the restore instruction post-dominates the call instruction with no intervening definition of the register. In other words, the compiler 125 determines (1) that every potential execution pass that reaches the function call instruction will pass the save instruction first, and that no intervening instruction will change the value stored in the register, and (2) every potential execution pass starting after the call instruction returns will reach the restore instruction, and that no intervening instruction use or change the value stored in the register. In other words, the value should be restored before its first use.

In some cases, where a non-standard call flow occurs (e.g., the called function throws an exception), there may be no suitable location to insert a single restore instruction relative to a function call instruction while meeting condition (2) above. Therefore, in some embodiments the compiler 125 places multiple restore instructions relative to the function call instruction, and does not list the multiple restore instructions in the annotations for the function call. In effect, this disables the rewriting optimization for the register at the particular function call site.

In another embodiment, the annotations may list all of the restore instructions. However, because each restore instruction should refer only to a single save instruction, the compiler 125 must ensure that this is the save instruction that will save the value that the restore instruction needs to restore. In some embodiments, a same restore instruction may be referred to from multiple distinct function call sites and/or a same save instruction may be referred to from multiple distinct restore instructions. In some embodiments, the save and restore instruction may be "save multiple" or "restore multiple" instructions, where a single instruction operates to save or restore multiple registers.

In some embodiments, the annotations for the function call instruction and/or for the restore instruction may be implemented via relocation records 205. For a function call site to refer to a particular restore instruction, the compiler 125 can create a relocation record 205 at the function call site that refers to the restore instruction. There may be multiple relocations at the same function call site. In some implementations, the compiler 125 uses a separate relocation type for each register that is to be restored. In other implementations, the compiler uses the same relocation type, but uses a well-defined set of restore instructions so that the linker 130 can identify which register is being restored by decoding the instruction. Table 2 provides an example of using an annotation within a relocation record 205 according to embodiments disclosed herein.

TABLE 2

Example relocation record saveloc:
    std r10, 48(r1)
...
    .reloc ., R_PPC64_R10RESTORE, restoreloc
    bl target
...
restoreloc:
    .reloc ., R_PPC64_R10SAVE, saveloc
    ld r10, 48(r1)

Within the example depicted in Table 2, "R_PPC64_R10RESTORE" and "R_PPC64_R10SAVE" are relocations that respectively point to the restore and save instructions for register r10. This example represents an implementation in which a separate relocation type is used for each register. The ".reloc" represents an assembler directive to emit a relocation, the "std r10 . . . " and "ld r10 . . . " are the respective save and restore instructions for register r10, the "saveloc" and "restoreloc" are labels respectively referring to the save and restore instructions, and "bl target" represents the call instruction.

At block 325 of method 300, the compiler 125 generates, from the one or more call-clobbered registers, a first list of registers that are referenced by the function. In some embodiments, the compiler 125 marks the function with (1) a list of registers that the function clobbers and (2) a list of subroutines called by the function. Each subroutine may also clobber one or more registers. In some cases, the function represents a "leaf" routine that does not call any further subroutines. For these cases, and especially where the function represents a relatively small amount of code, the ability to eliminate any save and/or restore instructions can have a relatively large impact on the efficient execution of the function.

For each compiled function, the compiler 125 generates the first list of registers that are clobbered by the function. The first list of registers represents a subset of the list of call-clobbered registers 160 (i.e., as defined by the ABI 150). The compiler 125 adds to the first list each call-clobbered register 160 that is used in generating the code for the function in the object file 140.

At block 335, the first annotation and the second annotation configure the linker to determine, during the subsequent linking of the object file and based on at least the first list, whether to eliminate the at least one save instruction and the at least one restore instruction corresponding to at least one of the one or more call-clobbered registers. Method 300 ends following completion of block 335.

Figure 4:
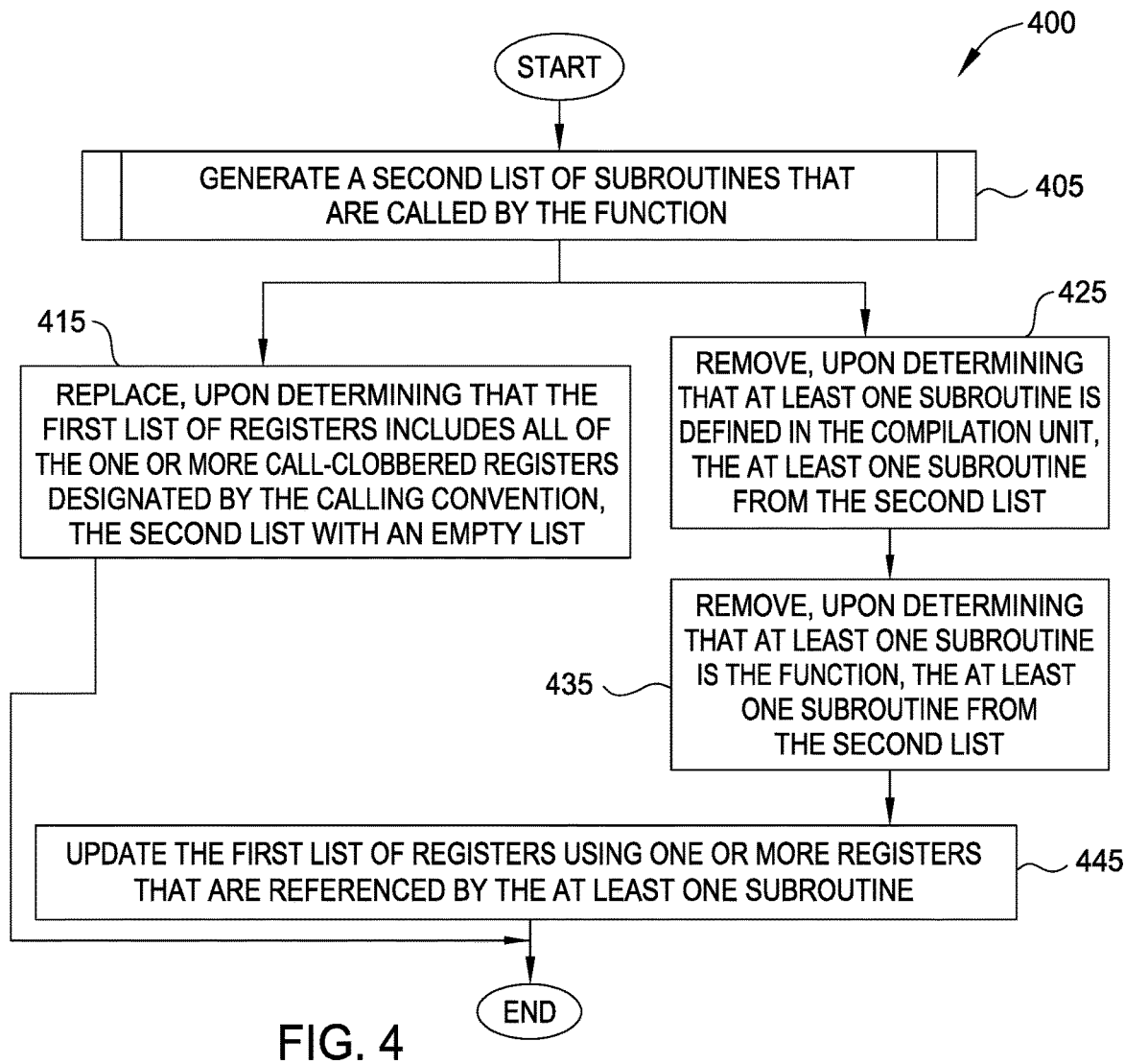
FIG. 4 is a flow chart illustrating a method for determining whether to eliminate the at least one save instruction and the at least one restore instruction, according to one or more embodiments disclosed herein.

As discussed above, the compiler 125 may mark the function with a list of subroutines called by the function, and each subroutine may clobber one or more of the call-clobbered registers 160. Method 400 of FIG. 4 illustrates an exemplary operation of compiler 125 to update the first list of registers based on one or more subroutines called within the function.

Figure 5:
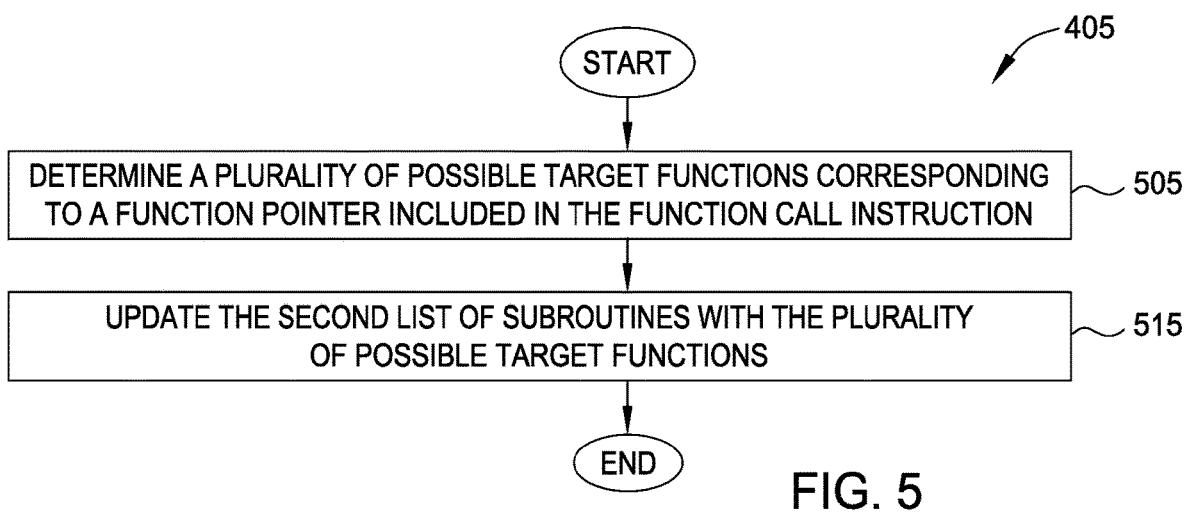
FIG. 5 is a flow chart illustrating a method for generating a list of subroutines called by a function, according to one or more embodiments disclosed herein.

Method 400 begins at block 405, where the compiler 125 generates a second list of subroutines that are called by the function. In some embodiments, the compiler 125 generates the second list based on characteristics of the function call. In the case where the function call is a direct call of the subroutine, the subroutine is added to the second list of subroutines. In other cases, the function call to the subroutine is an indirect call including a function pointer. Referring now to FIG. 5, the compiler 125 determines at block 505 a plurality of possible target functions corresponding to the function pointer, and updates at block 515 the second list of subroutines with the plurality of possible target functions. In one example, the compiler 125 uses data-flow analysis to determine a full set of possible target functions for the function call, and all the possible target functions are added to the list of called subroutines. In another example, the compiler 125 is unable to determine a full set of possible target functions, and the compiler 125 adds all of the call-clobbered registers to the first list.

Upon completion of block 405, method 400 proceeds to one of block 415 or block 425. At block 415, and upon determining that the first list of registers includes all of the one or more call-clobbered registers, the compiler 125 replaces the second list of subroutines with an empty list. In this case, the empty list may replace the second list as each subroutine would clobber only redundant registers (i.e., registers that are already included in the first list of registers).

In some embodiments, the compiler 125 performs further optimization of the second list at block 425 and/or block 435. While the sequence of blocks 425, 435 are shown in a logical path in parallel with block 415, alternate embodiments may include the determination of whether the first list of registers includes all of the one or more call-clobbered registers (of block 415) in a particular path with the blocks 425 and/or 435.

At block 425, the compiler 125 removes at least one subroutine from the second list upon determining that the at least one subroutine is defined in the compilation unit. In other words, for a first subroutine included within the second list of called subroutines, if the first subroutine is known to the compiler 125 (e.g., a static function that defined in the same compilation unit) and the compiler 125 knows which clobbered registers and called subroutines correspond to the first subroutine, the first subroutine may be removed from the second list of called subroutines. The compiler 125 further updates the first list with the clobbered registers of the first subroutine, and updates the second list with any subroutines called by the first subroutine.

At block 435, the compiler 125 removes at least one subroutine from the second list upon determining that the at least one subroutine is the calling function (i.e., the function makes a direct or indirect recursive call). At block 445, the compiler 125 updates the first list of registers using one or more registers that are referenced by the at least one subroutine identified in block 425. The method 400 ends following block 415 or block 445.

Once the compiler 125 has determined the first list of registers that are clobbered by the function and/or the second list of subroutines, the compiler 125 communicates the first list and/or the second list to the linker 130. In some embodiments, the compiler 125 provides the first list of clobbered registers in a bitmap within a data structure associated with the function definition, e.g., the symbol table entry for the function symbol. In some cases, the bitmap represents all of the call-clobbered registers, and each set bit corresponds to a register that is actually clobbered by the function. For the second list of subroutines called by the function, the compiler 125 may create a list of relocation records using a special relocation type, where each relocation record refers to one called subroutine. Some embodiments may use relocation records that already exist at the sites of direct function calls to implicitly inform the linker about the called subroutines. Table 3 provides an example of marking clobbered registers according to embodiments disclosed herein.

TABLE 3

Example marking of clobbered registers

.type test, @function
.clobbers test, r6, r9, r10
test:
...

Within the example depicted in Table 3, "test" represents the label identifying the function. The ".type" is an already-existing assembler directive that instructs the assembler to mark the entry for "test" in the symbol table as defining a function. A new directive ".clobbers" included in this example instructs the assembler to mark the entry for "test" as clobbering registers r6, r9, and r10.

For called subroutines, direct calls can be readily identified (e.g., the "bl target" above). For direct calls, the assembler uses a relocation record to identify the called function. Although no relocation record is available for indirect calls, embodiments may add a relocation type to identify any potential targets of indirect calls, such as is shown in Table 4:

TABLE 4

Example marking of clobbered registers

.reloc ., R_PPC64_CALLTARGET, target1
.reloc ., R_PPC64_CALLTARGET, target2
.reloc ., R_PPC64_CALLTARGET, target3
brctl where "brctl" is the indirect call instruction, and "target1", "target2", and "target3" are the potential call targets.

As discussed above, the object file 140 generated by the compiler 125 comprises annotations and/or lists that inform the linker 130 about the generated code. In turn, the linker 130 is configured to determine, during the linking of the object file 140 and based on at least the first list of registers that are referenced by a function, whether to eliminate save instruction(s) and/or restore instruction(s) when generating an executable file 145 from the object file 140. In some embodiments, the linker 130 accesses the information provided in the object file 140 (e.g., annotations and/or lists). For each function call instruction that is annotated, the linker 130 generally:

(1) determines whether the actual callee (i.e., the called function) is known to the linker 130 (e.g., a static function defined in the same compilation unit as the calling function) and was marked by the compiler 125;

(2) determines, if the callee is known and marked, a list of registers that are guaranteed to not be clobbered by the callee, using the first list of call-clobbered registers and the second list of called subroutines;

(3) recursively determines which call-clobbered registers and subroutines are called by the subroutines of the second list; and (4) for any register that is guaranteed to not be clobbered, if the corresponding annotations refer to save and restore instructions for the register, eliminate those instructions.

The linker 130 performs the optimization in three stages. In a first stage, the linker 130 determines for every function in the final executable file 145, a set of clobbered registers. The sets may be determined via an iterative process. First, the linker 130 determines the first list of clobbered registers and second list of called subroutines that the compiler 125 has provided as described above. As long as the second list of called subroutines is not empty, the linker 130 chooses one such called subroutine. If the selected subroutine is not known to the linker, the set of clobbered registers is set to all of the ABI-designated call-clobbered registers and the process terminates. However, if the selected subroutine is known to the linker, the sets of clobbered registers and called subroutine of the selected subroutine are merged into the first and second lists, and the selected subroutine may be removed from the second list. In some embodiments, the second list of called subroutines is always empty after the iterative process has completed.

In the second stage, the linker 130 considers each restore instruction that is referred to from a particular function call site. If the function call targets a callee function that is known to the linker 130 (e.g., according to the second list determined in the first stage), the callee function does not clobber the register that is restored by the restore instruction. As a result, the linker 130 may mark the restore instruction for elimination. In the case that multiple call sites refer to the same restore instruction, then the restore instruction may only be marked for elimination when all of the multiple call sites are known to not clobber the register. In implementations where a restore instruction is a "restore multiple" instruction, the restore instruction can only be marked for elimination when all registers are known to be not clobbered by any of the multiple call sites. However, if only some of the registers are known to be not clobbered, in some embodiments the linker 130 replaces the original restore multiple instruction with another restore multiple instruction that restores fewer of the registers, such that one or more registers will be guaranteed to be not clobbered. Any restore instructions that are marked for elimination may be replaced by a no-op instruction.

In the third stage, the linker 130 considers each save instruction that is referred to from a particular restore instruction. If all restore instructions that refer to a particular save instruction have been eliminated in the second stage, then the save instruction may also be marked for elimination. In implementations where the save instruction is a "save multiple" instruction, and some but not all restore instructions referring to the save instruction have been eliminated (or replaced) in the second stage, the linker 130 may replace the original save multiple instruction with another save multiple instruction that saves fewer registers, such that at least one save instruction may be eliminated. Save instructions that are marked for elimination may then be replaced by a no-op instruction.

Figure 6:
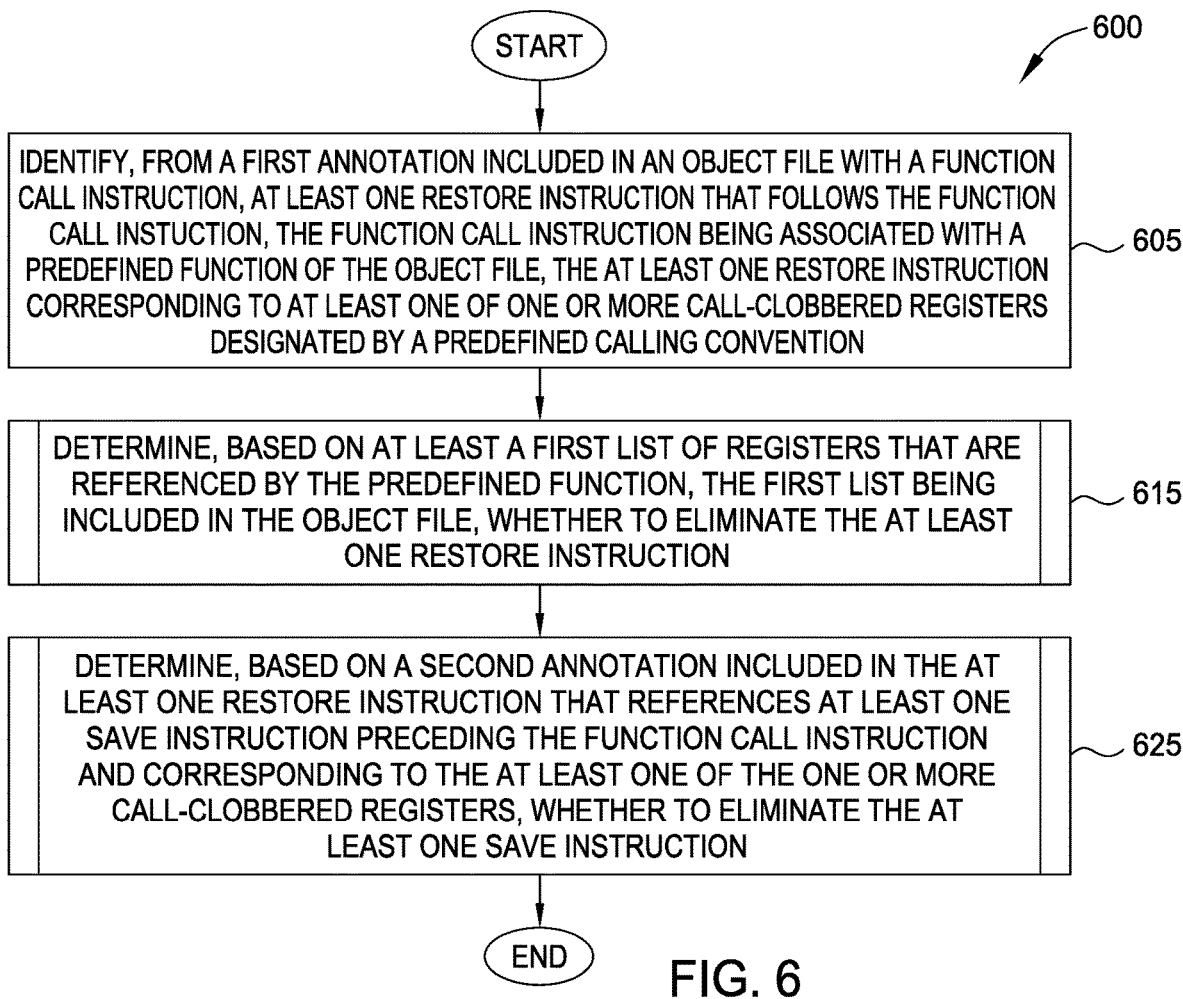
FIG. 6 is a flow chart illustrating a method for generating an executable file from an object file, according to one or more embodiments disclosed herein.

FIGS. 6-10 describe exemplary methods performed by a linker, some of the features of which are generally described above. Although separately described, any of the methods may be used in conjunction with each other and/or with other embodiments discussed herein. FIG. 6 is a flow chart illustrating a method 600 for generating an executable file from an object file, according to one or more embodiments disclosed herein. Method 600 begins at block 605, where the linker 130 (or any alternate suitable linker) identifies, from a first annotation included in an object file, at least one restore instruction that follows a function call instruction. The at least one restore instruction corresponds to at least one of one or more call-clobbered registers. At block 615, the linker 130 determines, based on at least the first list of registers that are referenced by the predefined function, whether to eliminate the at least one restore instruction. At block 625, the linker 130 determines, based on a second annotation included with the at least one restore instruction that references at least one save instruction preceding the function call instruction, whether to eliminate the at least one save instruction. Method 600 ends following completion of block 625.

Figure 7:
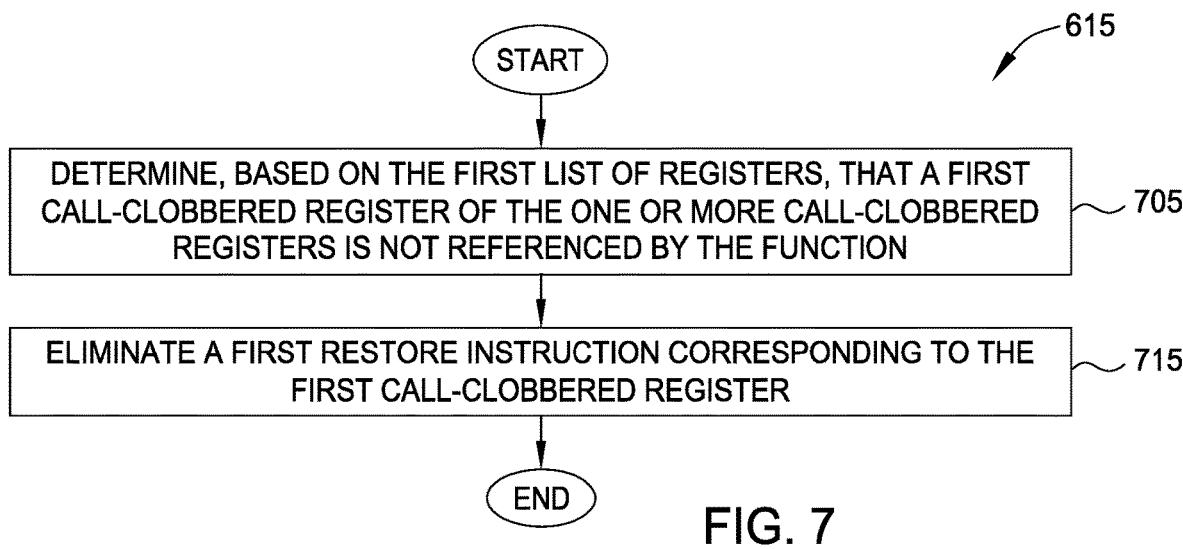
FIG. 7 is a flow chart illustrating a method for determining whether to eliminate at least one restore instruction, according to one or more embodiments disclosed herein.

FIG. 7 is a flow chart illustrating a method for determining whether to eliminate at least one restore instruction, according to one or more embodiments disclosed herein. The flow chart generally corresponds to block 615 of method 600 described above. At block 705, the linker determines, based on the first list of registers, that a first call-clobbered register of the one or more call-clobbered registers is not referenced by the function. At block 715, the linker eliminates a first restore instruction corresponding to the first call-clobbered register. Block 615 ends following completion of block 715.

Figure 8:
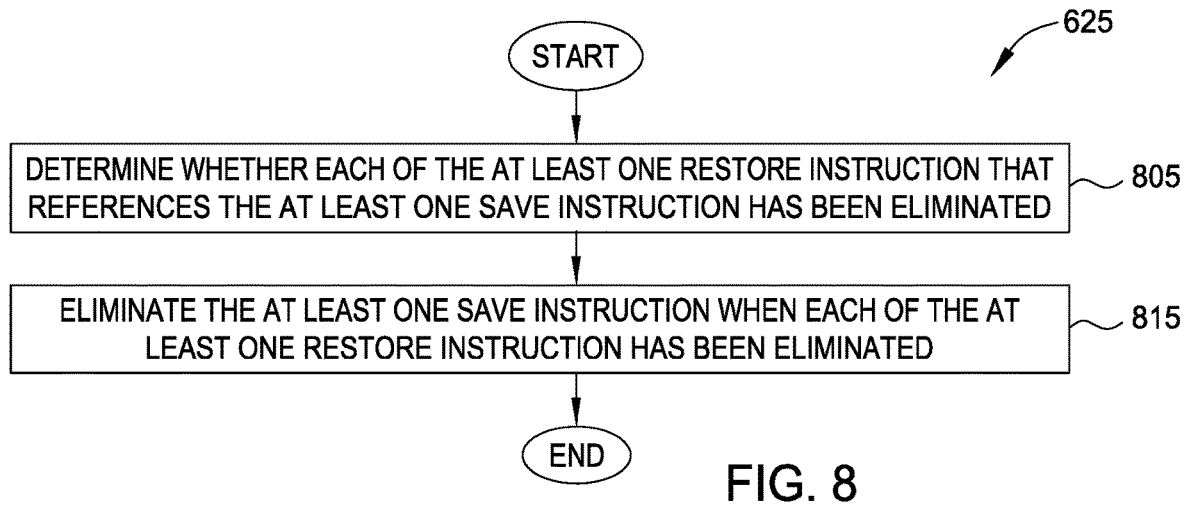
FIG. 8 is a flow chart illustrating a method for determining whether to eliminate at least one save instruction, according to one or more embodiments disclosed herein.

FIG. 8 is a flow chart illustrating a method for determining whether to eliminate at least one save instruction, according to one or more embodiments disclosed herein. The flow chart generally corresponds to block 625 of method 600 described above. At block 805, the linker determines whether each of the at least one restore instruction that reference the at least one save instruction has been eliminated. At block 815, the linker eliminates the at least one save instruction when each of the at least one restore instruction has been eliminated. Block 625 ends following completion of block 815.

Figure 9:
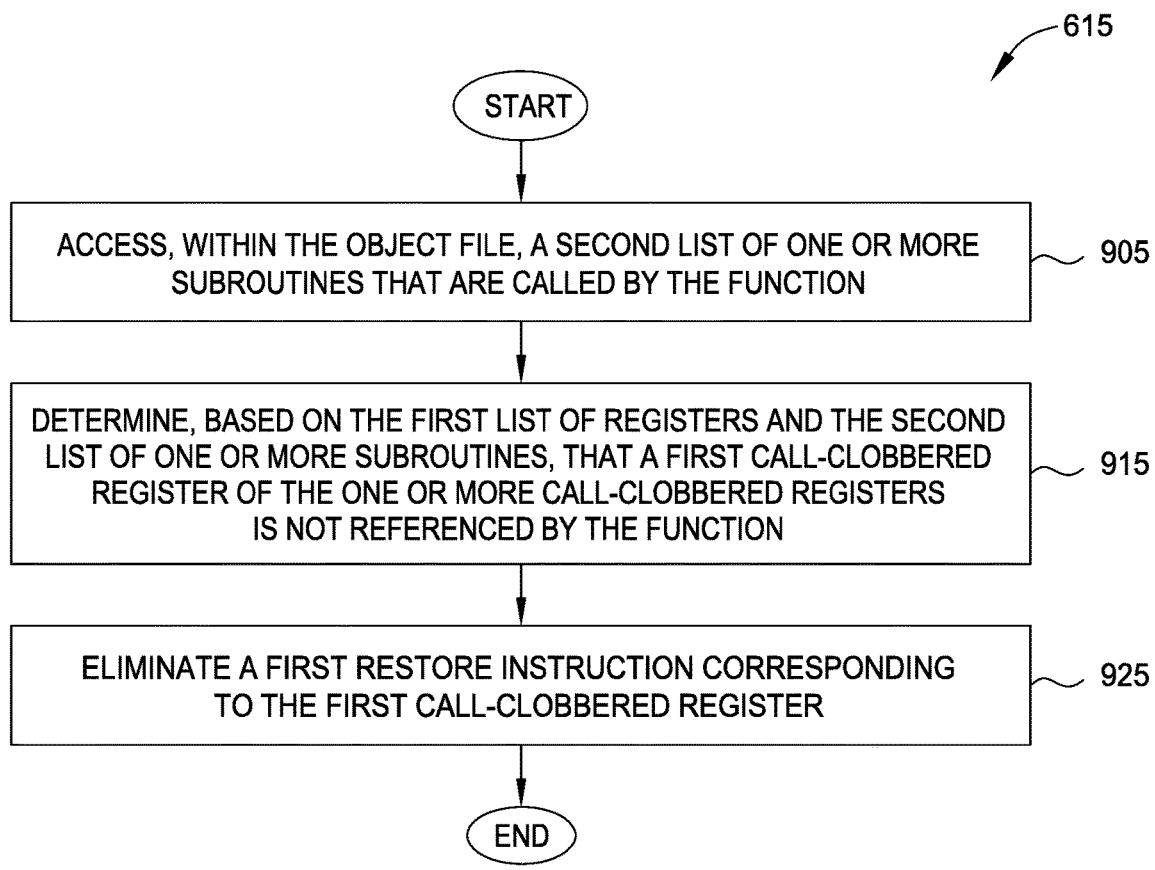
FIG. 9 is a flow chart illustrating a method for determining whether to eliminate at least one restore instruction, according to one or more embodiments disclosed herein.

FIG. 9 is a flow chart illustrating a method for determining whether to eliminate at least one restore instruction, according to one or more embodiments disclosed herein. The flow chart generally corresponds to block 615 of method 600 described above. At block 905, the linker accesses, within the object file, a second list of one or more subroutines that are called by the function. At block 915, the linker determines, based on the first list of registers and the second list of one or more subroutines, that a first call-clobbered register of the one or more call-clobbered registers is not referenced by the function. At block 925, the linker eliminates a first restore instruction corresponding to the first call-clobbered register. Block 615 ends following completion of block 925.

Figure 10:
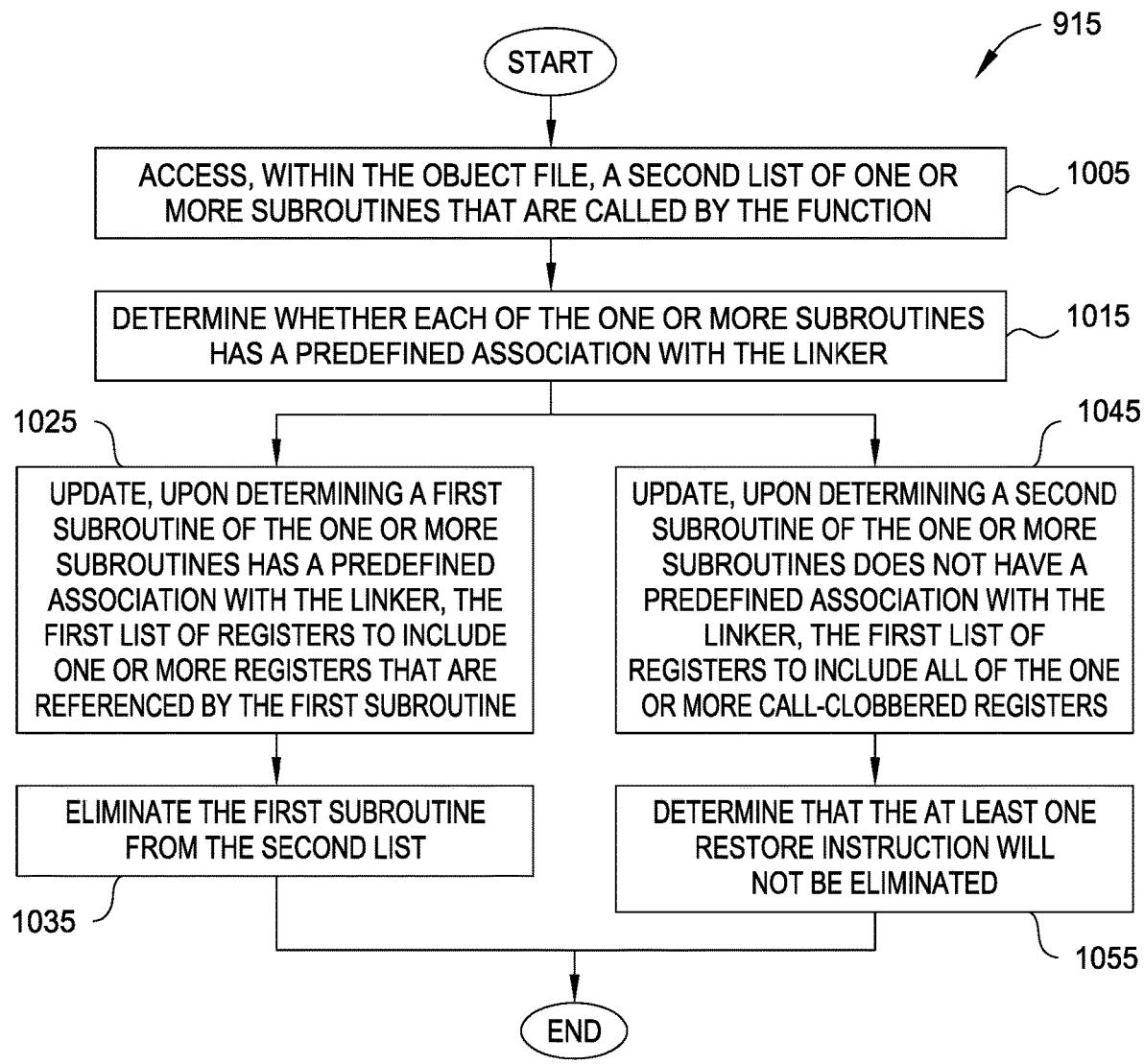
FIG. 10 is a flow chart illustrating a method for determining whether to eliminate at least one restore instruction, according to one or more embodiments disclosed herein.

FIG. 10 is a flow chart illustrating a method for determining whether to eliminate at least one restore instruction, according to one or more embodiments disclosed herein. The flow chart generally corresponds to block 915 depicted above in FIG. 9. At block 1005, the linker accesses, within the object file, a second list of one or more subroutines that are called by the function. At block 1015, the linker determines whether each of the one or more subroutines has a predefined association with the linker. Upon determining a first subroutine has a predefined association with the linker, the linker updates at block 1025 the first list of registers to include one or more registers that are referenced by the first subroutine. At block 1035, the linker eliminates the first subroutine from the second list.

However, upon determining a second subroutine of the one or more subroutines does not have a predefined association with the linker, the linker updates at block 1045 the first list of registers to include all of the one or more call-clobbered registers. At block 1055, the linker determines that the at least one restore instruction will not be eliminated. Block 915 ends following one of block 1035 or block 1055.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method of generating an executable file, the method comprising:
   receiving an object file that is associated with an architecture having a predefined calling convention designating one or more call-clobbered registers, wherein during generation of the object file at least one restore instruction, corresponding to at least one of the one or more call-clobbered registers, has been inserted to follow a function call instruction for a predefined function;
   identifying the at least one inserted restore instruction using a first annotation included with the function call instruction; and
   determining, based at least on a first list and a second list included in the object file, whether to eliminate the at least one inserted restore instruction in the executable file, wherein the first list indicates which registers of the architecture are referenced by the predefined function, wherein the second list indicates one or more subroutines that are called by the predefined function,
   wherein determining whether to eliminate the at least one inserted restore instruction is performed by a linker unit and comprises:

updating, upon determining a first subroutine of the one or more subroutines is not known to the linker unit, the first list to include all of the one or more call-clobbered registers; and
determining that the at least one inserted restore instruction will not be eliminated.

2. The method of claim 1, wherein determining whether to eliminate at least one inserted restore instruction comprises:
determining, based on the first list, that a first call-clobbered register of the one or more call-clobbered registers is not referenced by the function; and
eliminating a first restore instruction corresponding to the first call-clobbered register.

3. The method of claim 1, wherein the at least one inserted restore instruction includes a second annotation that references at least one save instruction, the at least one save instruction preceding the function call instruction and corresponding to the at least one of the one or more call-clobbered registers, the method further comprising:
determining whether to eliminate the at least one save instruction.

4. The method of claim 3, wherein determining whether to eliminate the at least one save instruction comprises:
determining whether each of the at least one inserted restore instruction that references the at least one save instruction has been eliminated; and
eliminating the at least one save instruction when each of the at least one inserted restore instruction has been eliminated.

5. The method of claim 1, wherein determining whether to eliminate the at least one inserted restore instruction further comprises:
updating, upon determining a second subroutine of the one or more subroutines is known to the linker unit, the first list to include one or more registers that are referenced by the first subroutine; and
eliminating the second subroutine from the second list.

6. The method of claim 1, wherein determining whether to eliminate at least one inserted restore instruction comprises:
determining, based on the first list and the second list, that a first call-clobbered register of the one or more call-clobbered registers is not referenced by the function; and
eliminating a first restore instruction corresponding to the first call-clobbered register.

7. The method of claim 1, wherein the first annotation is included within a relocation record of the object file.

8. The method of claim 1, wherein the first list is included in a predefined data structure associated with a symbol table entry for defining the function,
wherein the predefined data structure comprises a bitmap comprising one or more bits, and
wherein each bit of the one or more bits corresponding to a respective one of the one or more call-clobbered registers.

9. A computer program product comprising a computer-readable device having computer-readable program code embodied therewith, the computer-readable program code executable by one or more computer processors to perform an operation for generating an executable file, the operation comprising:
receiving an object file that is associated with an architecture having a predefined calling convention designating one or more call-clobbered registers, wherein during generation of the object file at least one restore instruction, corresponding to at least one of the one or more call-clobbered registers, has been inserted to follow a function call instruction for a predefined function;
identifying the at least one inserted restore instruction using a first annotation included with the function call instruction; and
determining, based at least on a first list and a second list included in the object file, whether to eliminate the at least one inserted restore instruction in the executable file, wherein the first list indicates which registers of the architecture are referenced by the predefined function, wherein the second list indicates one or more subroutines that are called by the predefined function,
wherein determining whether to eliminate the at least one inserted restore instruction is performed by a linker unit and comprises:
updating, upon determining a first subroutine of the one or more subroutines is not known to the linker unit, the first list to include all of the one or more call-clobbered registers; and
determining that the at least one inserted restore instruction will not be eliminated.

10. The computer program product of claim 9, wherein determining whether to eliminate at least one inserted restore instruction comprises:
determining, based on the first list, that a first call-clobbered register of the one or more call-clobbered registers is not referenced by the function; and
eliminating a first restore instruction corresponding to the first call-clobbered register.

11. The computer program product of claim 9, wherein the at least one inserted restore instruction includes a second annotation that references at least one save instruction, the at least one save instruction preceding the function call instruction and corresponding to the at least one of the one or more call-clobbered registers, the operation further comprising:
determining whether to eliminate the at least one save instruction.

12. The computer program product of claim 11, wherein determining whether to eliminate the at least one save instruction comprises:
determining whether each of the at least one inserted restore instruction that references the at least one save instruction has been eliminated; and
eliminating the at least one save instruction when each of the at least one inserted restore instruction has been eliminated.

13. The computer program product of claim 9, wherein determining whether to eliminate the at least one inserted restore instruction further comprises:
updating, upon determining a second subroutine of the one or more subroutines is known to the linker unit, the first list to include one or more registers that are referenced by the first subroutine; and
eliminating the second subroutine from the second list.

14. The computer program product of claim 9, wherein determining whether to eliminate at least one inserted restore instruction comprises:
determining, based on the first list and the second list, that a first call-clobbered register of the one or more call-clobbered registers is not referenced by the function; and
eliminating a first restore instruction corresponding to the first call-clobbered register.

15. The computer program product of claim 9, wherein the first annotation is included within a relocation record of the object file.

16. The computer program product of claim 9, wherein the first list is included in a predefined data structure associated with a symbol table entry for defining the function,
- wherein the predefined data structure comprises a bitmap comprising one or more bits, and
- wherein each bit of the one or more bits corresponding to a respective one of the one or more call-clobbered registers.

* * * * *